S. G. RHODES.
APPARATUS FOR PRODUCING PHOTOGRAPHIC TIME RECORDS OF METER READINGS.
APPLICATION FILED APR. 16, 1912.

1,090,413.

Patented Mar. 17, 1914.

2 SHEETS—SHEET 1.

Witnesses
Gertrude P. Porter
May T. McGarry

Inventor
Samuel G. Rhodes
By his Attorney

S. G. RHODES.
APPARATUS FOR PRODUCING PHOTOGRAPHIC TIME RECORDS OF METER READINGS.
APPLICATION FILED APR. 16, 1912.

1,090,413.

Patented Mar. 17, 1914.

2 SHEETS—SHEET 2.

Witnesses:
Gertrude N. Porter.
May T. McGarry.

Inventor
Samuel G. Rhodes
By his Attorney

UNITED STATES PATENT OFFICE.

SAMUEL G. RHODES, OF NEW YORK, N. Y., ASSIGNOR TO THOMAS E. MURRAY, OF NEW YORK, N. Y.

APPARATUS FOR PRODUCING PHOTOGRAPHIC TIME-RECORDS OF METER-READINGS.

1,090,413.

Specification of Letters Patent. Patented Mar. 17, 1914.

Application filed April 16, 1912. Serial No. 691,174.

*To all whom it may concern:*

Be it known that I, SAMUEL G. RHODES, a citizen of the United States, residing at New York, in the county of New York and State of New York, have invented a certain new and useful Improvement in Apparatus for Producing Photographic Time-Records of Meter-Readings, of which the following is a specification.

The invention is an apparatus for producing photographic time records of meter readings. The construction is such that the dials of the meter and the dial of a clock are simultaneously photographed upon a sensitized film which is actuated to give a new exposure at certain predetermined time intervals.

The object of the invention is to obtain an incontestable record, and, when applied to the distribution of electric current, more especially intended to show quantity of current passing through an electric meter at certain times, so that when the price of the current depends upon whether the supply is taken at one period of the day or another, or is based upon a maximum meter reading at any given time or for any predetermined length of time, the record will prove exactly when and for how long the current was taken, as well as the number of units supplied.

The apparatus is not limited to the particular embodiment herein set forth, but may be applied to any measuring apparatus which gives visible indications on dials, scales, number wheels, or the like.

Figure 1:
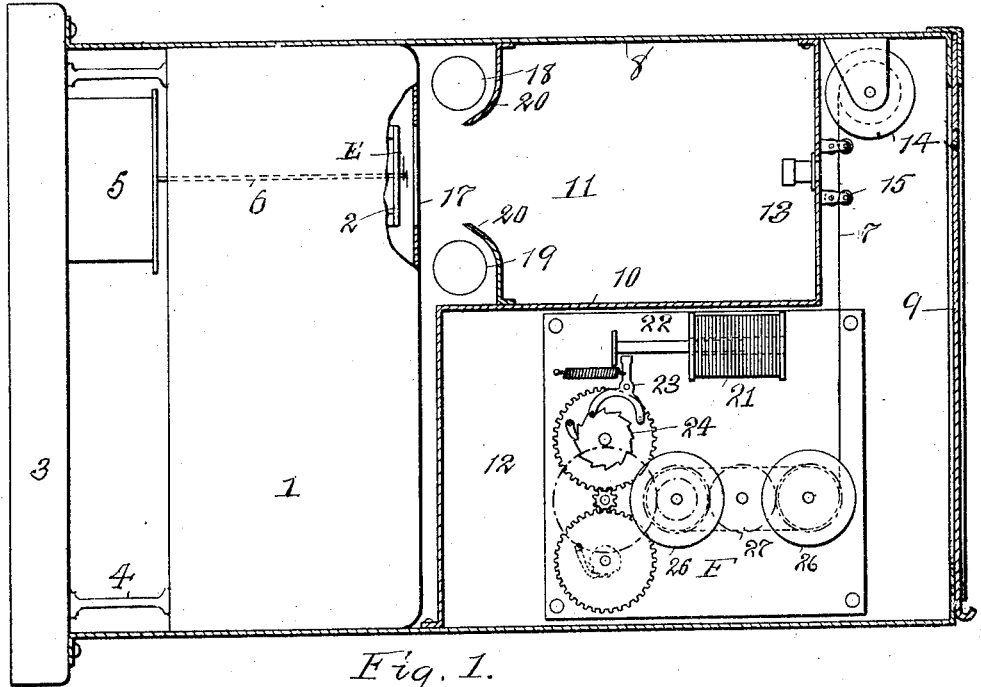
Figure 2:
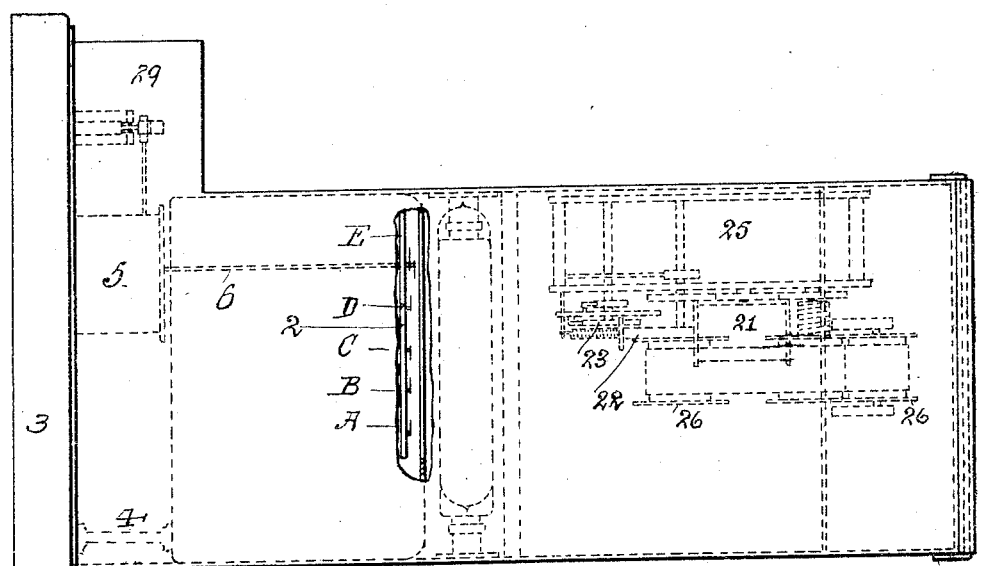
Figure 3:
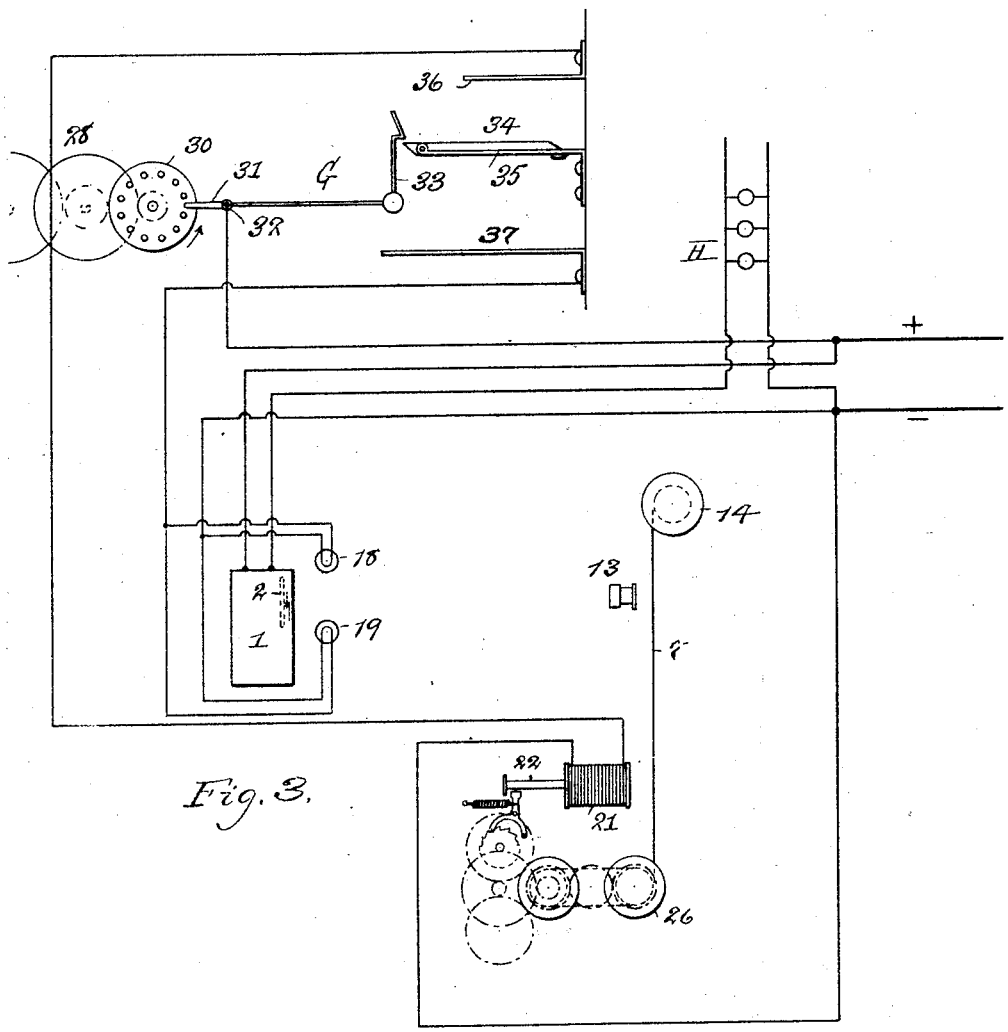
Figure 4:
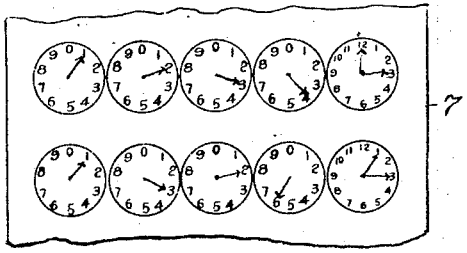

In the accompanying drawings Figure 1 is a vertical section of my apparatus. Fig. 2 is a top view. Fig. 3 is an electrical diagram showing the circuit connections, and Fig. 4 shows a portion of the photographic record strip.

Similar numbers and letters of reference indicate like parts.

1 represents an electric meter, of any suitable type, having the usual indicating dial plate 2, inscribed with four dials A, B, C, D, each with a finger operated by the meter mechanism, so that a reading in units, tens, hundreds and thousands, may be obtained therefrom. The meter is supported on a back-board or base 3, and at a distance therefrom by any suitable standards 4, the interval between meter and base being sufficient to accommodate an ordinary clock 5—preferably eight-day—which is also secured to the base. The clock arbor 6 which operates the hands is prolonged to extend through the meter casing, and the clock dial E is inscribed on the dial plate 2 adjacent to the meter dials A, B, C, D. The clock hands then being in front of said dial E, it is obvious that when a reading of the meter is taken from dials A, B, C, D, a reading of the time when said meter reading is taken can simultaneously be obtained from clock dial E. Hence, a photograph of the entire dial plate at any instant will show both the meter reading and the clock reading at the moment of exposure. Consequently, two photographs, if taken successively at a predetermined time interval apart, will show two meter readings and two time indications, and hence the number of units passing through the meter in that time interval. When used in connection with a watt-hour meter circuit, means are thus provided for determining the energy measured by the watt-hour during the interval of time elapsing between the taking of said photographs, which may be projected upon a continuous film 7, actuated by suitable mechanism hereafter described. The resulting record is then illustrated in Fig. 4, which shows, for example, that at 3 o'clock the meter registered 1 2 3 4 units, and at 3.05 o'clock, 1 3 2 6 units.

Fitting over the meter and clock and secured to base 3 is a box 8, preferably of metal and made light-proof, and provided on its front side with a sliding cover 9. A partition 10 divides the interior of the box into two compartments 11, 12. Compartment 11 is directly in front of the meter dial plate 2, and in its vertical wall, formed by partition 10, is a photographic lens 13 which projects an image of the dials A, B, C, D, E upon the strip 7 of sensitized film, which is carried upon the roll 14 and passes over guide rolls 15, immediately behind the lens 13, to the film actuating mechanism F. The strip 7, rolls and actuating mechanism are all disposed in compartment 12.

Supported horizontally within compartment 11 and in front of the sight-opening 17 in the meter casing are two glow-lamps 18, 19, one above, the other below said sight-opening, and affixed to the top wall of box 8 and to partition 10 are curved reflectors 20, arranged to throw the rays from said lamps through said sight-opening and upon the dial plate 2.

The film actuating mechanism F may be a spring-actuated train of any suitable type, and electrically controlled to cause successive exposures of the film at certain predetermined intervals. As here shown, the electro-magnet 21, when energized, draws in its plunger armature 22, and thereby actuates an escapement 23 to release one tooth of the ratchet wheel 24. Ratchet wheel 24 controls the clock train, driven by the usual wound spring, at 25, (dotted lines Fig. 2) to rotate the drums 26 which are connected by gear 27, and upon which is wound the film 7. The timing is such that the operation of the clock train by its spring, when the magnet 21 actuates the escapement to release one tooth of the ratchet, moves the film 7 ahead for a new exposure.

On one side of the box 8 is made a chamber 29 to receive a circuit-controlling device, best shown in Fig. 3. Suitably geared to the train of clock 5 (indicated at 28) is a pinion 30, having twelve pegs on its face, which, when said pinion rotates, in turn engage the arm 31 of a bell-crank lever G, pivoted at 32. The other arm 33 of lever G is suitably bent to engage the end of a switch 34, pivoted in standards 35. The rotation of pinion 30 in the direction of the arrow, Fig. 3, causes a pin to engage arm 31 and so to move downwardly arm 33, whereby the switch 34 is tilted to bring its extremity to a spring contact 36. The arm 33 continuing to decsend, first releases said switch, which falls back to its original position, and then meets a spring contact 37. When the pin on pinion 30 releases lever arm 31, the spring contact 36 throws the arm 33 back to its original position.

The circuits preferably proceed as follows: (1) From positive supply main, to bell-crank lever G, and, when said lever causes switch 34 to close circuit with contact 36, to magnet 21, and so to negative supply main. (2) From positive supply main, to bell-crank lever G, and, when said lever closes circuit with contact 37, to the lamps 18, 19, and so to negative main. (3) From positive supply main, to meter 1 and load H, which is the usual house circuit.

The timing and operation of the whole device is as follows: The train of clock 5 is timed to cause the pinion 30 to rotate once per hour, so that the bell-crank lever G will be operated by the pins on said pinion at regular intervals of five minutes. The first operation of said lever is to close circuit at spring contact 36, thus energizing magnet 21, and thereby releasing the train F to move film 7 ahead to expose a certain part of its surface in rear of the lens 13. The second operation of said lever is to close circuit at spring contact 37, and so to the lamps 18, 19, which illuminate the dial plate, and cause the image thereof to be photographed on the film 7. That image may be as indicated in Fig. 4, giving a reading of the meter and also of the clock. Upon the release of the bell-crank lever G from the engaging pin on pinion 30, the lamps 18, 19 are extinguished and said lever returns to normal position. Five minutes later, when the next succeeding pin on pinion 30 operates the bell-crank lever G, this operation is repeated, and a second image of the dial plate is photographed on the newly exposed surface of the film.

The device continues to work indefinitely, and, at convenient intervals, the film 7 is removed, developed and fixed—or if a negative, photo prints are made from it in the usual way. The result is, as shown in Fig. 4, a complete photographic record of the meter and clock readings made simultaneously every five minutes for any desired time.

I claim:

1. An electric meter, a dial therefor, a clock, a dial therefor, a continuous sensitized record strip, means for projecting an image of said dials upon said strip, and means controlled by said clock and actuated by the current supplied to said meter for exposing a new portion of said strip to receive said projected image.

2. An electric meter, a dial therefor, a clock, a dial therefor, a continuous sensitized record strip, means for projecting an image of said dials upon said strip, a motor for actuating said strip to expose successive portions thereof to receive said projected image, an electro-magnet controlling said motor and in circuit with said meter, and a switch controlling said magnet and controlled by said clock.

3. An electric meter, a dial therefor, a clock, a dial therefor, a continuous sensitized record strip, means for projecting an image of said dials upon said strip, means for intermittently illuminating said dials, a motor for actuating said strip to expose successive portions thereof to receive said projected image, an electro-magnet controlling said motor, and a switch controlling said magnet and said illuminating means and controlled by said clock.

In testimony whereof I have affixed my signature in presence of two witnesses.

SAMUEL G. RHODES.

Witnesses:
 GERTRUDE T. PORTER,
 MAY T. McGARRY.